United States Patent [19]
Saikia et al.

[11] Patent Number: 5,801,239
[45] Date of Patent: Sep. 1, 1998

[54] PROCESS FOR THE PREPARATION OF ALKALI SALT OF CARBOXY ALKYL CELLULOSE

[75] Inventors: Chowdhury Nath Saikia; Tridip Goswami; Anil Chandra Ghosh, all of Jorhat, India

[73] Assignee: Council of Scientific & Industrial Research, New Deli, India

[21] Appl. No.: 785,471

[22] Filed: Jan. 17, 1997

[51] Int. Cl.$^6$ .............. C07H 1/00; C08B 11/12; C08B 11/00; C08B 15/05

[52] U.S. Cl. .............. 536/124; 536/56; 536/84; 536/97; 536/98; 536/101

[58] Field of Search .............. 536/124, 56, 84, 536/97, 41, 98, 101

[56] References Cited

U.S. PATENT DOCUMENTS 3,374,224 3/1968 Sommers .................. 536/98

FOREIGN PATENT DOCUMENTS 61157501 7/1986 Japan .

*Primary Examiner*—John Kight
*Assistant Examiner*—Everett White
*Attorney, Agent, or Firm*—Marvin E. Jacobs

[57] ABSTRACT

This invention relates to a process for the preparation of alkali salt of carboxyalkyl cellulose with good solubility in salt water which is useful for petroleum drilling muds, which comprises (a) powdering high alpha cellulose obtained from fast growing plants or bamboo pulp, (b) preparing the alkali metal salt of cellulose by mixing the high alpha cellulose pulp obtained from fast growing plant or bamboo with an alkalinating agent in the presence of an inert organic solvent, (c) etherifying the prepared alkali cellulose to alkali metal salt of cellulose with an etherifying agent at a temperature in the range of 70°–80° C., (d) recovering the alkali metal salt of carboxyalkyl cellulose and (e) drying the resulting alkali metal salt of carboxalkyl cellulose.

17 Claims, No Drawings

5,801,239

PROCESS FOR THE PREPARATION OF ALKALI SALT OF CARBOXY ALKYL CELLULOSE

FIELD OF THE INVENTION

This invention relates to an improved process for the preparation of alkali metal salts of carboxyalkyl cellulose like propyl and methyl cellulose. More particularly, the invention relates to a process for the preparation of alkali metals salts of carboxymethyl cellulose, specially sodium carboxymethyl cellulose. The alkali metal salts of carboyxmethyl cellulose prepared by the process of the present invention from thixotropic aqueous solutions and are useful as additive in petroleum recovery(drilling) operation from under ground bore wells. In the recovery operation, it is customary to use additives for facilitating the smooth drilling so as to recover the oil. The thixotropic aqueous solution prepared using the alkali metal salts of sodium carboxy methyl cellulose is useful as such additive.

BACKGROUND AND PRIOR ART REFERENCE OF THE INVENTION

Alkali metal salts of carboxyalkyl cellulose particularly carboxymethyl cellulose are generally manufactured by converting cellulose to alkali cellulose by treating cellulose with an alkali hydroxide solution under a temperature in the range of 5°–30° C. and then etherifying the resultant alkali cellulose by conventional methods, such as reacting with chloro acetic acid or alkali metal salts of chloro acetic acid. Alkali metal salts of carboxyalkyl cellulose particularly sodium salt of carboxymethyl cellulose is used in most cases, in the form of aqueous solutions and are employed to function in a number of ways such as surface sizing and internal strength improving agents for paper, as binder in pigment and coating colours, in silicone water emulsions, and in laminations etc. Some of the alkali salts of carboxymethyl cellulose grades are also used in some food preparations such as inhibitor of growth of ice crystals in ice-cream and sherbeths.

There are many patents relating to the process for the manufacture of different grades of alkali salt of carboxymethyl cellulose for the above referred uses. Some of the relevant patents are referred to below: U.S. Pat. No. 2,510,355 describes a method for preparation of carboxymethyl cellulose in which cellulose is first treated with caustic solution in rotary drum and then the etherifying agent namely monochloro acetic acid (MCA) is added to the sodium cellulose and the resultant carboxymethyl cellulose is recovered by conventional method such as by washing with aqueous alcohol so as to remove the excess of unreacted acid.

The U.S. Pat. No. 3,374,224 describes a process for preparing an alkali metal salt of carboxymethyl cellulose, the improvement which comprises reacting alkali cellulose with an etherifying agent consisting essentially of from about 2 to 20 mole percent dichloroacetic acid, the balance monochloroacetic acid and recovering the resulting carboxymethyl cellulose by conventional methods such as washing with aqueous alcohol so as to remove the excess of unreacted acid.

British Patent 1,372,256 describes a process for making an alkali metal salt of carboxymethyl cellulose which has a degree of substitution (d.s) of 0.4 to 1.2, a water solubility less than 35% water retention value (WRV) of 1,000 to 7,000 and salt water retention value (SRV) of 400 to 2,500 in which process in the first step cellulose is slurried in an aqueous solution of an inert organic diluent and is contacted with water soluble alkali metal hydroxide and in the second step, the resulting alkali cellulose is etherified by reaction with monochloroacetic acid while still slurried in the aqueous solutions of the diluent and in which the weight ratio throughout the process of total liquid:cellulose is 15 to 40:1 the molar ratio of monochloroacetic acid:anhydroglucose unit of cellulose is 0.4 to 8.1 and of alkali metal hydroxide:anhydroglucose unit of cellulose after neutralisation of monochloroacetic acid is at least 0.5,the weight ratio of water: cellulose is 3 to 7:1 and of inert organic diluent : water is 4 to 10:1 and in which there is an excess of neutralised monochloroacetic acid over the unreacted moles of alkali metal hydroxide for a sufficient period after the addition of the monochloroacetic acid to effect insolubility in the carboxymethyl cellulose having a normally water—soluble d.s. and in which the contact with the alkali metal hydroxide is conducted at 0° to 30° C. for 0.1 to 1 hour and the second step is conducted at a temperature of 60° to 80° C. for a time, that is, between 3 and 24 hours.

In many of the above cited known processes the distribution of degree of substitution of the alkali salt of carboxymethyl cellulose are not uniform, for example 0.54 to 0.90 and sometimes complete solubility in water cannot be achieved. Moreover, in most of the cases the solutions of the alkali salt of carboxymethyl cellulose do not exhibit sufficient suspending and stabilizing properties. In addition,there is a marked loss of viscosity of the solutions such as 30–60%, when aqueous solutions are made in salt water. Moreover, in most of the cases, the diluent systems used for reaction, utilize large quantity of water miscible or immiscible solvent (diluent:cellulose ratio 25–50:1) in the steeping, etherification and washing stages, thereby increasing the cost of production by approx.30%.

Due to the above mentioned drawbacks, the alkali salt of carboxymethyl cellulose prepared by the process described above are not useful as an additive in the petroleum recovery operations.

It is well known that alkali metal salt of carboxymethyl cellulose is used, in most cases, in the form of aqueous solution and therefore, susceptibility to temperature aided decomposition and a marked loss of solution viscosity by salt, for example, sodium chloride are always envisaged. This type of behaviour of alkali metal salt of carboxymethyl cellulose is more prominent with ethers having irregular degree of substitution distribution. Generally, carboxymethyl cellulose having an average degree of substitution of above 2 exhibits very stable solution, while with degree of substitution below 0.5, the solutions are not stable enough. A carboxymethyl cellulose with a more uniform substituent distribution marked by excellent salt water resistance, is of great practical importance in application drilling mud additive.

SUMMARY OF THE INVENTION

The present invention provides a process for the preparation of alkali metal salt of carboxyalkyl cellulose which is used as an additive in the petroleum recovery operations, from high alphacellulose pulp obtained from fast growing plants or bamboo.

OBJECTS AND DETAILED DESCRIPTION OF THE INVENTION

Therefore, the main objective of the present invention is to provide an improved process for the production of high viscosity and highly water soluble grade of alkali metal salt such as sodium and potassium of carboxyalkyl cellulose, preferably sodium salt of carboxymethyl cellulose in the preferred range of degree of substitution distribution between 1.05 to 1.80.

Another object of the present invention is to provide an improved process for the preparation of alkali metal salt of carboxymethyl cellulose with the use of minimum amount of diluents in steeping, etherification and in washing stages to make the process economical.

Yet, another objective of the present invention is to provide an improved process for the production of alkali salt of carboxyalkyl cellulose particularly carboxymethyl cellulose with least water retention value, high salt water resistance, high viscosity, exhibiting excellent suspending and stabilizing properties which can be used in petroleum recovery operations.

Still another objective of the present invention is to provide an improved process for the preparation of alkali salt of carboxyalkyl cellulose with salt water resistance property, for use in oil drilling, which does not remarkably lose viscosity in contact with salt solutions, as is the case with carboxymethyl cellulose prepared by hitherto known processes which are used in oil drilling operations, thereby providing excellent viscosity resistant product in contact with salt solution.

One more object of the present invention is to provide a process for the preparation of alkali salt of carboxyalkyl cellulose, particularly carboxymethyl cellulose, from high alpha-cellulose, particularly carboxymethyl cellulose, from high alpha-cellulose pulps prepared either from fast growing plants which are pulp plants apart from bamboo or bamboo having 96.42% cellulose, 1.46% pentosan and degree of polymerization 1080. The term "fast growing plant" means those plants which attains optimum pulpable biomass with in a period of 1–10 years, such plants are annual like kenaf, *Hibiscus cannabinus* and perennial plants like Leucaena leucocephala and bamboo and alike.

Accordingly, the present invention provided an improved process for the preparation of alkali salt of carboxyalkyl cellulose having good solubility in salt water useful for petroleum drilling operations which comprises(a) powdering the cellulose pulp obtained from fast growing plants or bamboo to a size in the range 50–100 BSS sieve (b) preparing the alkali metal salt of the powdered cellulose by mercerising with the alkalinating agent in the amount in the range from 1.0 to 1.30 mole of the agent per mole of glucose unit of an inert solvent in the proportion of cellulose:solvent equal to 1:20 and the water to solvent ratio 1:12 at a temperature in the range 5° to 28° C. with intermittent agitation, (c) etherification of the so produced alkali cellulose by treating with an etherifying agent at a temperature in the range of 70°14 80° C. with constant agitation, (d) Recovering the alkali salt of carboxyalkyl cellulose by conventional methods and (e) Drying the resulting alkaline salt of carboxy alkyl cellulose at a temperature in the range of 65°–80° C.

The etherification agent used may be selected from monochloracetic acid, ethylene oxide, propylene oxide and methyl chloride.

In an embodiment of the present invention, the alkali metal salt of carboxyalkyl cellulose prepared is sodium carboxymethyl cellulose by employing sodium hydroxide solution and etherifying with monochloracetic acid.

In a preferred embodiment of the invention, equal parts (by weight) of cellulose and equal parts (by volume) of alkali solution (70–75%) are used for the mercerization and it was carried out at a temperature of 15° C. for a period of 1.5–2.0 hours with intermittent agitation. After completion of the mercerization period, the etherification was carried out by using the known etherification agent and the reaction was carried out for a period ranging from 60–180 min at a temperature preferably of 75° C. with constant agitation.

After the reaction, the product was removed from the reactor and excess alkali was neutralised with glacial acetic acid. The solvent was then removed from the slurry by centrifugation. The product is then again washed with a 75% aqueous ethanol/methanol to neutral pH. This purified product was then dried in an air circulating oven perferably at a temperature in the range of 65°–80° C.

The inert solvent used may be selected from hexanol, isopropanol, butanol etc. The cellulose used may be selected from high alpha cellulose pulps obtained from the fast growing plants and bamboo and the like with alpha cellulose content ranging from 90% to 97%. The alkalinating agent used may be selected from sodium hydroxide, potassium hydroxide and the like.

Preferably, in the present invention, the alkali salt of carboxymethyl cellulose is recovered from the reaction mixture by neutralising with a mild organic acid perferably glacial acetic acid and centrifuging and the alkali salt of carboxymethyl cellulose thus recovered is washed with aqueous alcohol solution of methanol/ethanol or their mixture at neutral pH. Thereafter, the alkali salt of carboxyalkyl cellulose is dried by circulating hot air at a temperature in the range of 65°–80° C. More preferably, equal parts of cellulose and equal parts of alkali solution are used for alkalinating and the alkalinating agent is sodium hydroxide and the etherification agent used is monochloroacetic acid.

The following examples are given to illustrate the invention. These examples should not, however be constructed to limit the scope of the invention. Though, the examples are given with reference to the process for the preparation of sodium salt of carboxymethyl cellulose, it should not be considered to restrict the scope of this invention. Other similar salts such as potassium salt of carboxymethyl can also be prepared by using this invention for similar products.

Example I 60 parts of powdered cellulose was taken in a five liter stainless steel jacketed vessel with agitating arrangement and then 1200 parts of iso-propyl alcohol (98% purity) and 100 parts of water were added and the cellulose was steeped for 10 minutes. To this, 60 parts by volume of sodium hydroxide (70% of 98% purity) was added at 15° C. and the reaction mixture was kept for 2.0 hours with intermittent agitation.

To the soda cellulose 100 parts thus formed, 105 parts of monochloracetic acid (98% purity) was added and mixed thoroughly at 15° C. and then the temperature was raised gradually to 75° C. within 10 mins. The reaction was continued at 75° C. for 120 min. after which the reaction mixture was cooled to room temperature. The excess alkali was neutralised by adding glacial acetic acid (10%). The water iso-propanol mixture was centrifuged out and the carboxymethyl cellulose thus obtained was washed with aqueous ethanol to neutral pH. The carboxymethyl cellulose was then dried, powdered and sieved through a 100 BSS sieve. The yield of sodium salt of carboxymethyl cellulose was 125% (75 g).

Example II 125 parts of powdered cellulose was mixed with 125 parts of water and 1200 parts of iso-propyl alcohol (98%). To this, 100 parts by volume of sodium hydroxide (75% of purity 98%) was added at 15° C. and the system was kept for 2.0 hours with intermittent agitation.

To the soda cellulose thus prepared, 215 parts of solid monochloroacetic acid (98% purity) was added and mixed thoroughly at 15° C. and then the temperature was raised gradually to 65° C. within 30 min. The reaction was continued for 120 min. at that temperature. After the reaction time, the reaction mixture was cooled to room temperature (30° C.).

The carboxymethyl cellulose formed was then washed, dried and sieved through a 100 BSS mesh. The yield of sodium salt of carboxymethyl cellulose was 155 g.

Example III

To 200 parts of 60 mesh cellulose powder, 145 parts of water and 1350 parts of iso-propyl alcohol (98% purity) were added, 160 parts by volume of sodium hydroxide (75% purity 98%) was added at 15°–20° C. and the reaction mixture was kept for 90 min.

The soda cellulose thus formed was taken for etherification reaction. 260 parts solid monochloroacetic acid (98% purity) was added and the temperature was raised gradually to 70° C. and maintained at that temperature for 120 min. After the reaction time, the reaction mixture was cooled to room temperature (30° C.). The carboxymethyl cellulose formed was then washed, dried and passed through a 100 BSS mesh. The yield of sodium salt of carboxymethyl cellulose was 250 g.

Measurement were made for average degree of substitution (DS), viscosity at 10° C., 27° C. (RT) and 70° C. of 1% and 5% solutions and the resistance to salinity was found out. The results are shown in Table 1.

We claim:

1. An improved process for the preparation of alkali salt of carboxyalkyl cellulose with good solubility in salt water which is useful for petroleum drilling muds, which comprises:
   (a) powdering high alpha cellulose containing from 90–97% by weight of alpha cellulose obtained from fast growing plants or bamboo pulp to a size in the range of 50–100 BSS sieve,
   (b) preparing the alkali metal salt of cellulose by mixing the high alpha cellulose pulp obtained from fast growing plant or bamboo with an alkalinating agent in an amount ranging from 1.0–1.30 mole of the agent/per mole of the glucose unit in the cellulose pulp, in the presence of an inert organic solvent, the ratio of cellulose pulp to solvent being in the range of 1:12 with intermittent agitation,
   (c) etherifying the prepared alkali metal salt of cellulose with an etherifying agent at a temperature in the range of 70°–80° C. with constant agitation to form an alkali metal salt of carboxyalkyl cellulose,
   (d) recovering the alkali metal salt of carboxyalkyl cellulose having a degree of substitution of 1.08 to 1.80, and
   (e) drying the resulting alkali metal salt of carboxyalkyl cellulose by heating at a temperature in the range of 65°–80° C. in an air circulating oven.

2. An improved process according to claim 1 wherein the cellulose used is high alpha cellulose pulp obtained from fast growing plants which attain optimum pulpable biomass within a period of 1–10 years.

3. An improved process as claimed in claim 2 in which the fast growing plants are selected from a group consisting of kenaf, Hibiscus cannabis, Leucaena leucocephala and bamboo.

4. An improved process as claimed in claim 1 wherein the inert organic solvent used is selected from butanol, isopropanol, hexanol and the like.

5. An improved process as claimed in claim 1 wherein the alkalinating agent is selected from sodium hydroxide and potassium hydroxide.

6. An improved process as claimed in claim 1 wherein the etherification agent is selected from monochloracetic acid, ethylene oxide, propylene oxide and methyl chloride.

7. An improved process as claimed in claim 1 wherein the amount of etherifying agent used for etherification ranges from 100–260 parts by volume.

TABLE 1

| Product from | Viscosity in distilled water Cp* | | | | | | Viscosity in 4% NaCl solution Cp* | | | | | | Resistance to salinity | Degree of Substitution** (D.S.) |
|---|---|---|---|---|---|---|---|---|---|---|---|---|---|---|
| | 1% solution | | | 5% Solution | | | 1% solution | | | 5% solution | | | | |
| | 10° C. | 27° C. | 70° C. | 10° C. | 27° C. | 70° C. | 10° C. | 27° C. | 70° C. | 10° C. | 27° C. | 70° C. | | |
| Example I | 1132 | 980 | 456 | 30,600 | 12,300 | 8,800 | — | 660 | — | 18,000 | 10,600 | 4,240 | 0.67 | 1.22 |
| Example II | 1300 | 1130 | 680 | 32,600 | 15,300 | 12,800 | — | 840 | — | 21,000 | 11,400 | 5,632 | 0.74 | 1.57 |
| Example | 1425 | 1187 | 780 | 34,230 | 16,200 | 14,180 | — | 960 | — | 20,800 | 10,780 | 5,380 | 0.81 | 1.72 |

*Viscosity was measured in a Brookfield Synchro - electric viscometer

**Resistance to salinity = $\frac{\text{Viscosity of 1 Wt. \% CMC in 4\% Aq. NaCl solution (Cp)}}{\text{Viscosity of 1 Wt. \% CMC in pure water (Cp)}}$ Inference: The viscosity data, degree of substitution and data on resistance to salinity indicate that product exhibit superior properties in comparison to other sodium carboxy methyl cellulose generally available.

8. An improved process as claimed in claim 1 wherein the etherification is effected at temperature in the range of 65°–100° C.

9. An improved process as claimed in claim 8 in which the etherification is effected at a temperature in the range of 70°–80° C.

10. An improved process as claimed in claim 1 wherein the alkali salt of carboxymethyl cellulose is recovered from the reaction mixture by neutralizing with a mild organic acid and centrifuging.

11. An improved process as claimed in claim 10 in which the mild organic acid is glacial acetic acid.

12. An improved process as claimed in claim 1 wherein the alkali salt of carboxymethyl cellulose recovered is washed with aqueous alcohol solution of methanol/ethanol or their mixture at neutral pH.

13. An improved process as claimed in claim 1 wherein the alkali salt of carboxyalkyl cellulose is dried by circulating hot air at a temperature in the range of 65°–80° C.

14. An improved process as claimed in claim 1 wherein equal parts of cellulose and equal parts of alkali solution are used for alkalinating.

15. An improved process as claimed in claim 1 wherein the alkalinating agent is sodium hydroxide and the etherification agent used is monochloroacetic acid.

16. An improved process as claimed in claim 1 in which the degree of substitution is from 1.22 to 1.72.

17. An improved process as claimed in claim 16 in which the alkali metal salt resistance to salinity ranges from 0.67 to 0.81.

* * * * *